(12) United States Patent
Kamiya

(10) Patent No.: US 11,522,396 B2
(45) Date of Patent: Dec. 6, 2022

(54) ROTOR AND MOTOR

(71) Applicant: FANUC CORPORATION, Yamanashi (JP)

(72) Inventor: Yohei Kamiya, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 49 days.

(21) Appl. No.: 16/903,666

(22) Filed: Jun. 17, 2020

(65) Prior Publication Data
US 2020/0412187 A1   Dec. 31, 2020

(30) Foreign Application Priority Data

Jun. 26, 2019   (JP) ............................. JP2019-117963

(51) Int. Cl.
*H02K 1/27* (2022.01)
*H02K 1/276* (2022.01)

(52) U.S. Cl.
CPC ......... *H02K 1/276* (2013.01); *H02K 2201/03* (2013.01)

(58) Field of Classification Search
CPC ............... H02K 1/276; H02K 2201/03; H02K 2213/03; H02K 1/2766; H02K 21/14
See application file for complete search history.

(56) References Cited

U.S. PATENT DOCUMENTS

| | | | | |
|---|---|---|---|---|
| 2008/0258573 | A1* | 10/2008 | Kamiya | F16H 3/727 310/156.02 |
| 2010/0026128 | A1* | 2/2010 | Ionel | H02K 1/276 310/156.53 |
| 2014/0109392 | A1 | 4/2014 | Nishikuma et al. | |
| 2015/0137632 | A1* | 5/2015 | Takahashi | H02K 1/2766 310/54 |
| 2018/0091011 | A1* | 3/2018 | Higashino | H02K 9/00 |
| 2020/0014260 | A1* | 1/2020 | Arai | H02K 1/28 |

FOREIGN PATENT DOCUMENTS

WO   WO-2012157107 A1   11/2012

* cited by examiner

*Primary Examiner* — Thomas Truong
(74) *Attorney, Agent, or Firm* — Robert P. Michal, Esq.; Carter, DeLuca & Farrell LLP

(57) ABSTRACT

A rotor includes: a rotor core; a plurality of plate-shaped magnets forming multiple poles, each arranged in the rotor core with a pair of magnetic pole faces thereof being positioned in a direction intersecting with the radial direction of the rotor core; and a plurality of voids formed in the rotor core, each arranged in contact with the magnetic pole face that is located on a side closer to the central axis of the rotor core, of each of the magnets forming multiple poles.

9 Claims, 6 Drawing Sheets

ROTOR AND MOTOR

CROSS-REFERENCE TO RELATED APPLICATION

This application is based upon and claims the benefit of priority from Japanese Patent Application No. 2019-117963 filed on Jun. 26, 2019, the contents of which are incorporated herein by reference.

BACKGROUND OF THE INVENTION

Field of the Invention

The present invention relates to a rotor and a motor.

Description of the Related Art

There has been a known motor called an IPM (Interior Permanent Magnet) type motor in which magnets are embedded inside a rotor core.

International Publication No. WO 2012/157107 discloses a rotor manufacturing method in which cleaved magnet pieces are assembled in a rotor core with their cleaved surfaces meshed with each other.

SUMMARY OF THE INVENTION

In the IPM type motor, when the gap between the stator (stator core) and the rotor (rotor core) is widened, the magnetic flux density in the stator and the rotor becomes lower, so that iron loss at low load can be suppressed. However, when the gap between the stator core and the rotor core is widened, the absolute value of the motor inductance lowers, so that both the magnet torque and the reluctance torque lowers, and hence the torque constant decreases.

It is therefore an object of the present invention to provide a rotor and a motor that can reduce iron loss while suppressing decrease in torque constant as much as possible without widening the gap between the stator and the rotor.

The first aspect of the present invention resides in a rotor, including:

a rotor core;

a plurality of plate-shaped magnets forming multiple poles, each of the magnets being arranged in the rotor core with a pair of magnetic pole faces thereof being positioned in a direction intersecting with the radial direction of the rotor core; and a plurality of voids formed in the rotor core and each arranged in contact with one magnetic pole face of the magnetic pole faces that is located on a side closer to the central axis of the rotor core, of each of the magnets forming multiple poles.

The second aspect of the present invention resides in a motor including the above rotor and a stator.

According to the present invention, it is possible to reduce iron loss while suppressing decrease in torque constant as much as possible without widening the gap between the stator and the rotor.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing a preferred embodiment with reference to the accompanying drawings.

Embodiment

Figure 1:
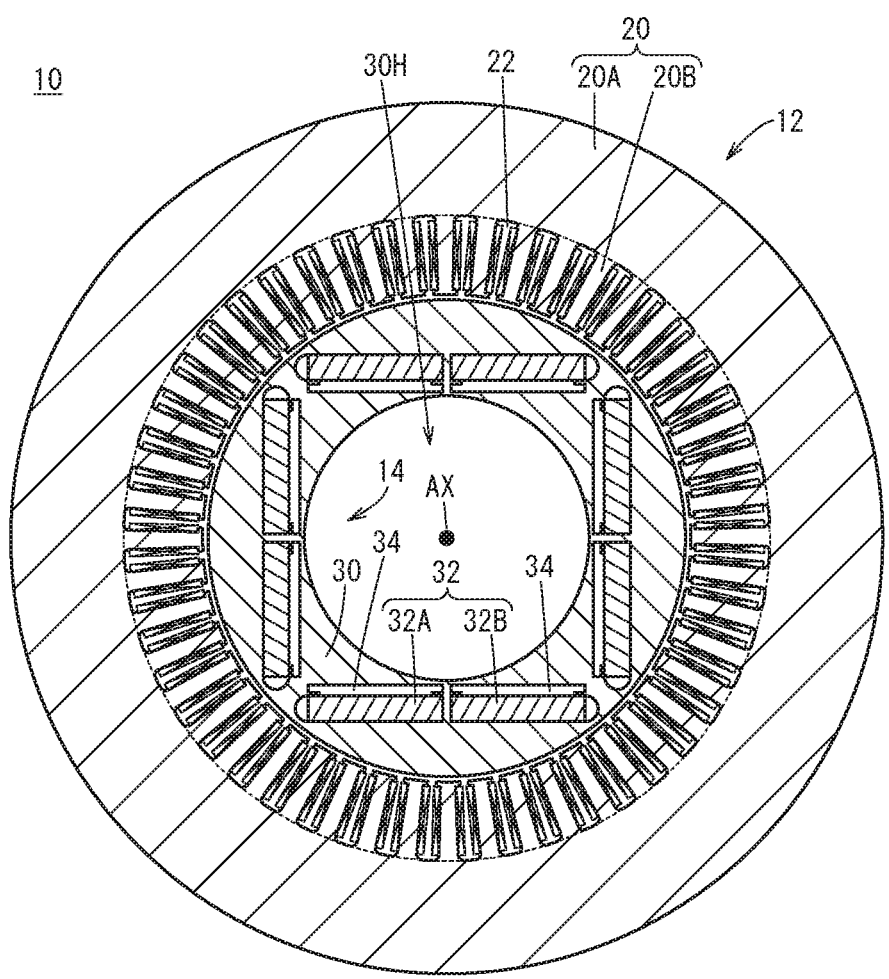
FIG. 1 is a schematic diagram showing part of a motor of the present embodiment.

FIG. 1 is a schematic diagram showing part of a motor 10 of the present embodiment. FIG. 1 shows a state where the motor 10 is viewed from the axial direction of the motor shaft. The motor 10 includes a stator 12 and a rotor 14.

The stator 12 generates a force for rotating the rotor 14, and is arranged on the outer peripheral side of the rotor 14 and spaced by a gap from the rotor 14. The stator 12 includes a stator core 20 and a plurality of coils 22.

The stator core 20 includes a core body 20A formed in a tubular shape, and a plurality of teeth 20B protruding from the inner peripheral surface of the core body 20A toward the central axis of the core body 20A and arranged at intervals in the circumferential direction of the core body 20A. The core body 20A may be formed in a tubular shape by mutually joining a plurality of separate core pieces in the circumferential direction. Each of the multiple coils 22 is arranged on one or two or more teeth 20B.

The rotor 14 rotates by force generated in the stator 12, and is arranged on the inner peripheral side of the stator 12 with a gap being formed between the rotor 14 and each of the multiple teeth 20B of the stator core 20. The rotor 14 includes a rotor core 30 and a plurality of magnets 32 forming multiple poles. In the present embodiment, the rotor 14 has four poles.

The rotor core 30 is formed in a tubular shape having a through hole 30H in which the motor shaft is inserted. The rotor core 30 may be formed in a tubular shape by laminating multiple plates of electromagnetic steel or others. The central axis AX of the rotor core 30 coincides with the central axis of the core body 20A of the stator core 20 and the central axis of the motor shaft.

The magnets 32 forming multiple poles are provided on the rotor core 30. The magnets 32 forming multiple poles each have substantially the same shape and the same size, and are symmetrically arranged inside the rotor core 30 apart from each other in the circumferential direction of the rotor core 30. Each of the magnets 32 forming multiple poles extends from one end face to the other end face of the tubular rotor core 30.

In the above motor 10, the rotor 14 rotates by the interaction between the magnetic field generated in the stator 12 by electric current flowing through the coils 22 in the stator 12 and the magnetic field generated by the magnets 32 forming multiple poles in the rotor 14. As the rotor 14 rotates, the motor shaft inserted through the through hole 30H of the rotor 14 rotates together with the rotor 14.

Figure 2:
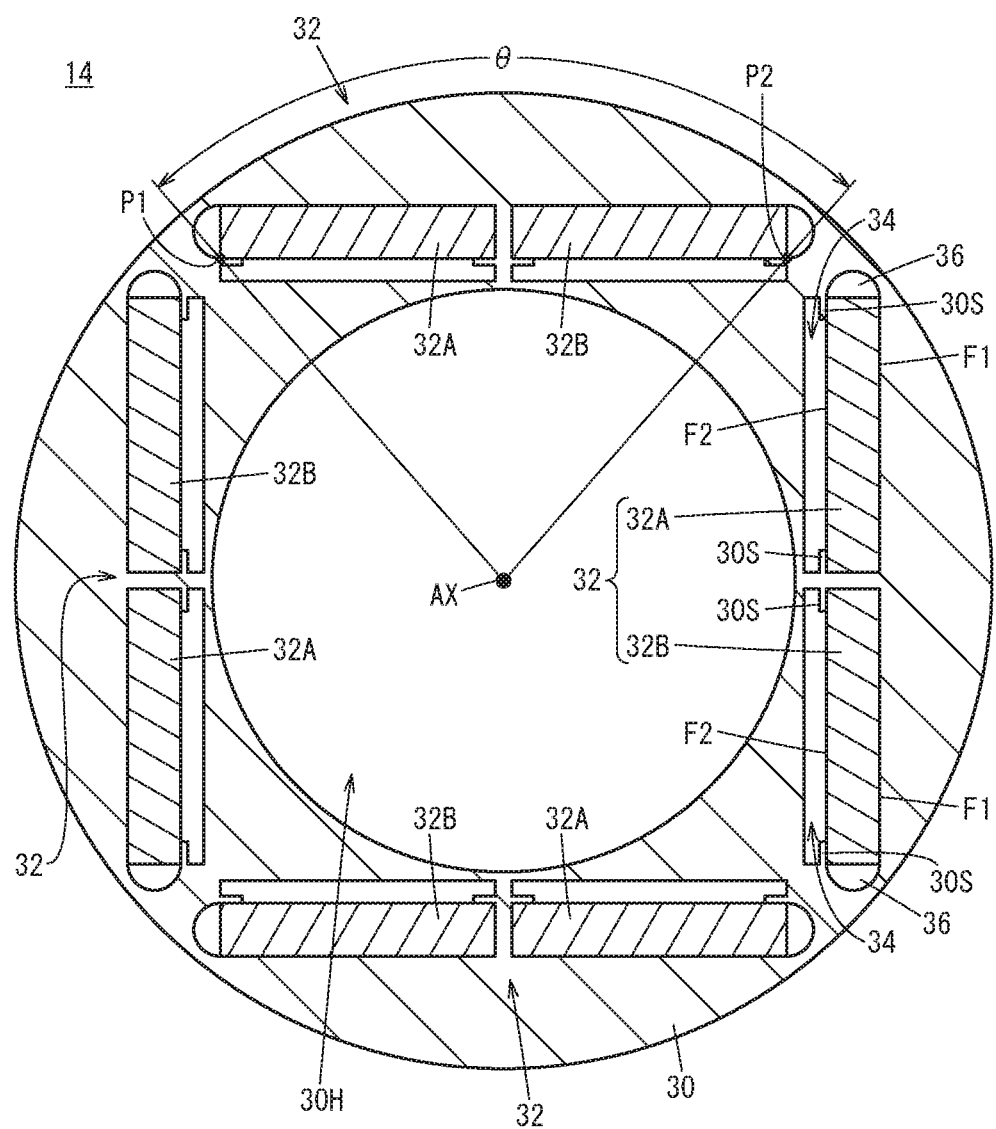
FIG. 2 is a schematic diagram showing the rotor of FIG. 1.

Referring next to FIG. 2, the rotor 14 will be described in more detail. FIG. 2 is a schematic diagram showing the rotor 14 of FIG. 1. FIG. 2 shows the rotor 14 viewed from the axial direction of the central axis AX of the rotor core 30.

In this embodiment, each of the magnets 32 forming multiple poles is divided into a pair of magnet pieces 32A and 32B, which each are arranged with their magnetic poles oriented in the same direction with respect to the radial direction of the rotor core 30. The divided magnet pieces 32A and 32B are substantially the same in shape and size, and each have a pair of magnetic pole faces F1 and F2. The paired magnetic pole faces F1 and F2 are positioned in a direction intersecting with the radial direction of the rotor core 30. In the present embodiment, of the pair of magnetic pole surfaces F1 and F2, the magnetic pole face F1 facing toward the outer peripheral side of the rotor core 30 and the magnetic pole face F2 facing toward the inner peripheral side of the rotor core 30 are substantially parallel to each other. Each of the pair of magnetic pole faces F1 and F2 forms a surface that is positioned at the forefront of a portion having a magnetic pole, i.e., S pole or N pole, and corresponds to a largest surface of the plate-shaped magnet piece 32A, 32B in the present embodiment.

A plurality of voids 34 are formed in the rotor core 30 in order to reduce iron loss while suppressing decrease in torque constant as much as possible. The multiple voids 34 are provided respectively for the divided magnet pieces 32A and 32B. That is, the number of voids is the number obtained by multiplying the number of pieces into which the magnet 32 forming one pole is divided, by the number of poles.

Each of the multiple voids 34 is a closed space surrounded by the rotor core 30 and the magnet piece 32A or 32B when the rotor 14 is viewed from the axial direction of the central axis AX of the rotor core 30. In the example shown in FIGS. 1 and 2, the shape of each of the multiple voids 34 is substantially the same as the outer shape of the magnet piece 32A or 32B when the rotor 14 is viewed from the axial direction of the central axis AX of the rotor core 30. However, it may be different from the outer shape of the magnet 32.

Each of the multiple voids 34 is in contact with the magnetic pole face F2 facing the inner peripheral side of the rotor core 30. In other words, each of the multiple voids 34 contacts the magnetic pole face F2, which lies on a side closer to the central axis AX of the rotor core 30. Supporting members (supporting pieces) 30S are formed on the magnetic pole face F2 side. In the present embodiment, the supporting members 30S are a pair of projections that protrude from the rotor core 30 toward the void 34 from both ends of the void 34, and support each of the divided magnet pieces 32A, 32B.

Each of the multiple voids 34 is in contact with the whole magnetic pole face F2 other than its part where the supporting members 30S (the pair of protrusions) are in contact. When the rotor 14 is viewed from the axial direction of the central axis AX of the rotor core 30, each of the multiple voids 34 is in contact with the entire region other than its part that is in contact with the supporting members 30S, of a long side of the plate-shaped magnet pieces 32A or 32B that is located closer to the central axis AX of the rotor core 30.

The rotor core 30 is formed with a plurality of flux barriers 36 for suppressing leakage of magnetic flux generated from the magnets 32. The multiple flux barriers 36 are each a hollow space that is disposed at each of both end portions in the width direction of each of the magnets 32 forming multiple poles and is in contact with the end portion. In the present embodiment, each of the magnets 32 forming multiple poles is divided into a pair of magnet pieces 32A and 32B. Therefore, the flux barriers 36 on both sides of the magnet 32 of one pole are arranged such that one flux barrier is positioned at an end of the one magnet piece 32A, in the width direction, that is farther from the other magnet piece 32B while another flux barrier is positioned at an end of the other magnet piece 32B, in the width direction, that is farther from the magnet piece 32A.

Referring next to FIG. 2, which is a diagram of the rotor 14 viewed from the axial direction of the central axis AX of the rotor core 30, the angle around the center of the rotor 14, of each of the magnets 32 forming multiple poles, will be described in more detail. However, since all the angles around the center of the rotor 14 of the magnets 32 forming multiple poles are the same, the angle of the magnet 32 with one pole, around the center of the rotor 14, will be described here.

In this embodiment, when the rotor 14 is viewed from the axial direction of the central axis AX of the rotor core 30, the angle θ formed by two line segments connecting the center of the rotor core 30 to respective two vertexes P1 and P2 of the magnet 32 of one pole (which will be referred to as the magnet angle), is smaller than a value obtained by dividing 360° by the number of poles formed by the magnets 32.

Specifically, the above two vertexes P1 and P2 are vertexes that are farthest from each other on a side closer to the central axis AX of the rotor core 30, among the vertexes of a pair of magnet pieces 32A and 32B of the magnet 32 forming one pole. That is, the vertex P1 is one of the two vertexes of one magnet piece 32A on the inner side of the rotor core 30, that is located on the farther side from the other magnet piece 32B, and the vertex P2 is one of the two vertexes of the other magnet piece 32B on the inner side of the rotor core 30, that is located on the farther side from the one magnet piece 32A.

In this embodiment, since the rotor 14 has four poles, the magnet angle θ is smaller than 90°. In other words, the divided magnet pieces 32A and 32B forming the magnet 32 of one pole are provided in the rotor core 30 so that the magnet angle θ becomes smaller than 90°.

Figure 3:
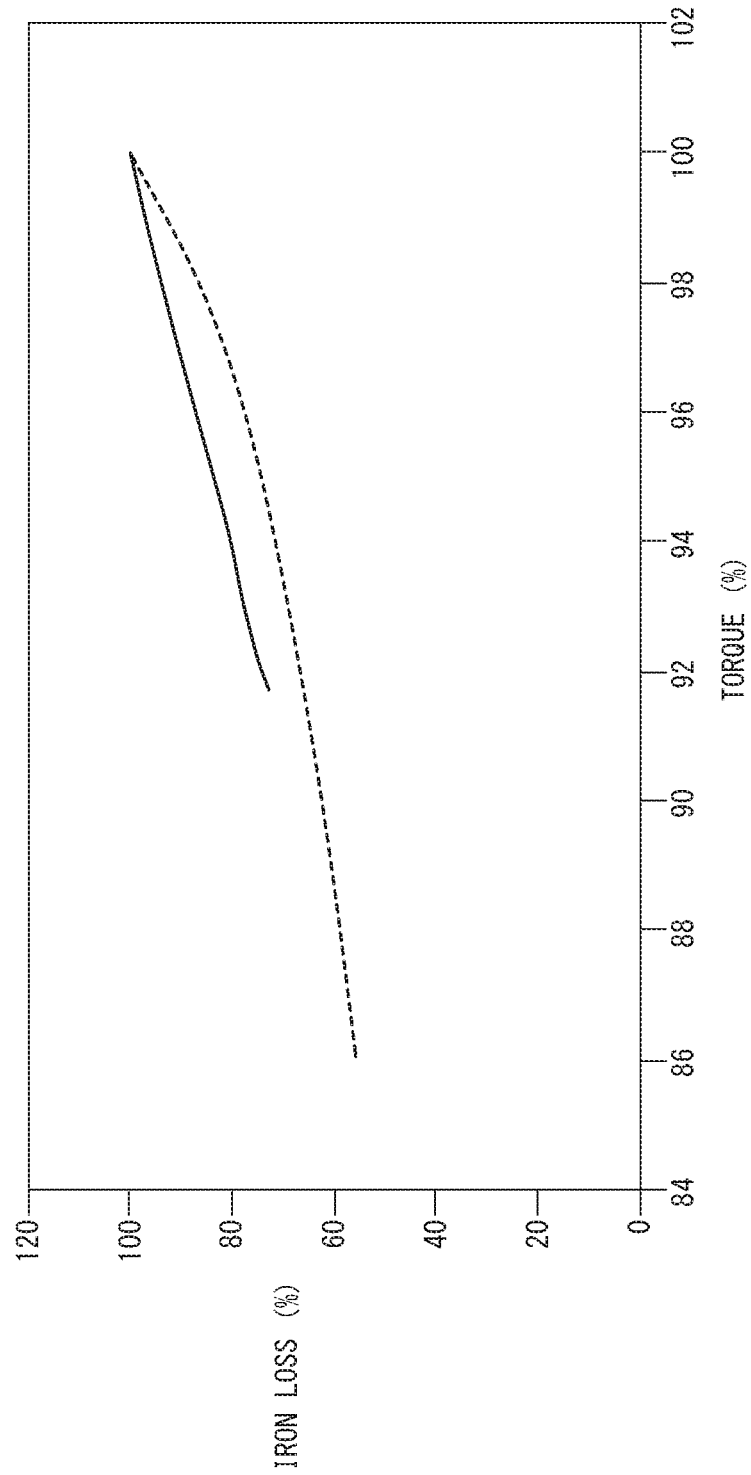
FIG. 3 is a graph showing a simulation result (1) regarding the motor of FIG. 1.
Figure 4:
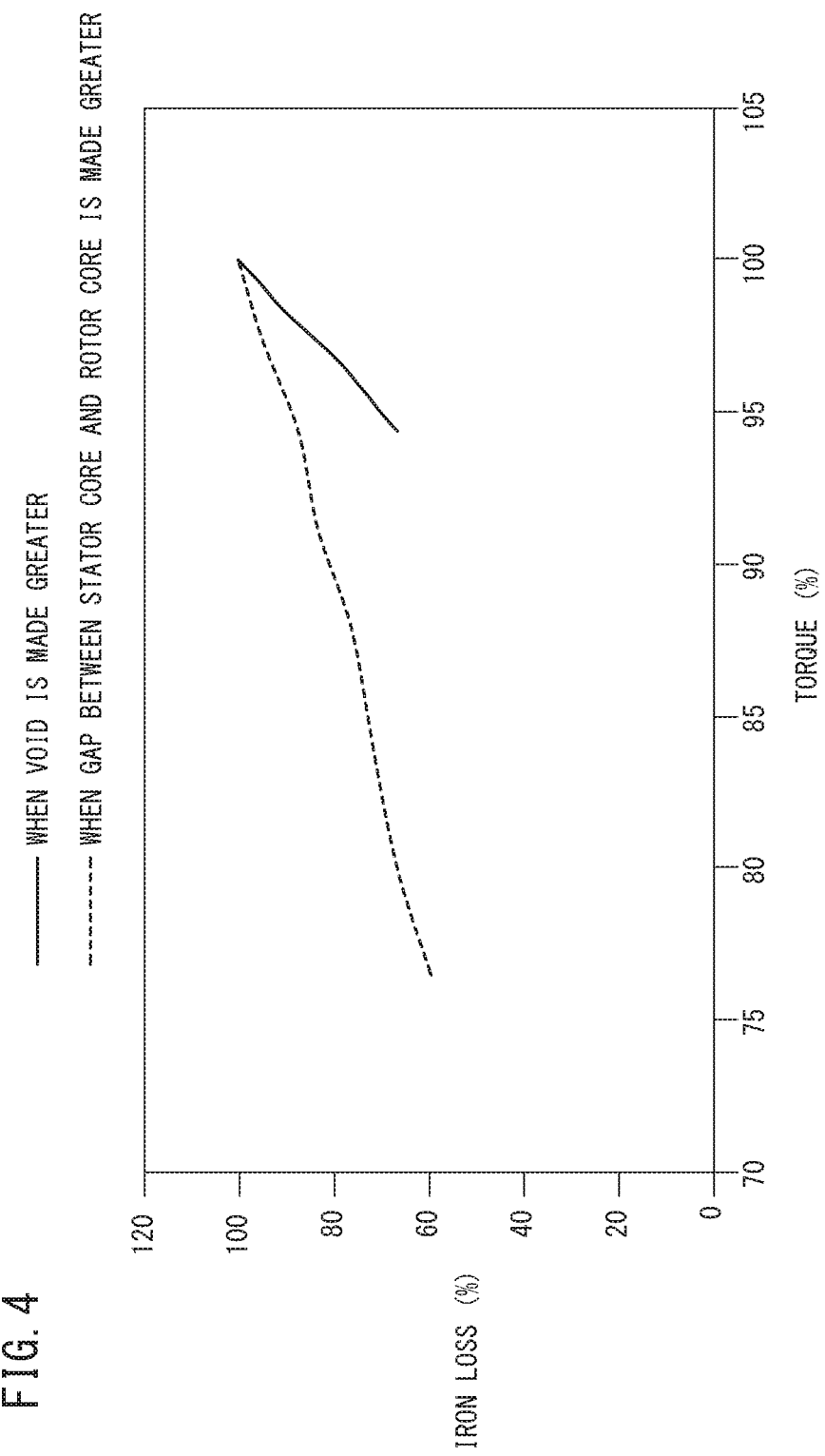
FIG. 4 is a graph showing a simulation result (2) regarding the motor of FIG. 1.

Now, FIGS. 3 and 4 shows graphs showing simulation results of the motor 10 regarding the magnet angle θ. FIG. 3 is a graph showing changes in iron loss and torque when the magnet angle θ is 82.730 (i.e., relation between iron loss reduction and torque reduction). FIG. 4 is a graph showing changes in iron loss and torque when the magnet angle θ is 61.28° (i.e., relation between iron loss reduction and torque reduction). The iron loss reduction means reduction in iron loss of the rotor core 30 when there is no load. The torque reduction means reduction in the maximum total torque generated in the motor 10.

The broken lines in the graphs of FIGS. 3 and 4 indicate the relationships between the iron loss reduction and the torque reduction when the contact area of the void 34 with the magnetic pole face F2 is constant while the gap between the stator core 20 and the rotor core 30 is increased. Here, the gap between the stator core 20 and the rotor core 30 becomes greater as the plot on the broken line goes from the right side to the left side on the graph.

The solid lines in the graphs of FIGS. 3 and 4 indicate the relationships between the iron loss reduction and the torque reduction when the gap between the stator core 20 and the rotor core 30 is constant while the contact area of the void 34 with the magnetic pole face F2 is increased. Here, the contact area of the void 34 with the magnetic pole face F2 becomes greater as the plot on the solid line goes from the right side to the left side on the graph.

Under the condition that the magnet angle θ is 82.73° (FIG. 3), the ratio of the iron loss reduction relative to the torque reduction in the case that the gap between the stator core 20 and the rotor core 30 is increased (the broken line in the graph) becomes greater than in the case that the contact area of the void 34 with the magnetic pole face F2 is increased (the solid line in the graph).

On the other hand, under the condition that the magnet angle θ is 61.28° (FIG. 4), the ratio of the iron loss reduction relative to the torque reduction in the case that the contact area of the void 34 with the magnetic pole face F2 is increased (the solid line in the graph) becomes greater than in the case that the gap between the stator core 20 and the rotor core 30 is increased (the broken line in the graph).

That is, when the magnet angle θ is 61.28°, the invention offers the advantageous effect for making it possible to increase the ratio of the iron loss reduction relative to the reduction of the maximum total toque generated by the motor 10 without widening the gap between the stator core 20 and the rotor core 30.

Although not shown, it has been found that the above effect can be obtained as long as the magnet angle θ is 61.280 or less, regardless of the shape of the magnet 32 (magnet pieces 32A, 32B) and the size of the contact area of the void 34 with the magnetic pole surface F2. On the other hand, although not shown, it has been found that, if the magnet angle θ exceeds 61.28°, there are some cases where the iron loss reduction rate (percentage) becomes equal to or lower than the total torque reduction rate (percentage), depending on the shape of the magnet 32 (magnet pieces 32A and 32B) or the size of the contact area of the void 34 with the magnetic pole surface F2. Therefore, the magnet angle θ is preferably 61.28° or less.

[Modifications]
(Modification 1)

Figure 5:
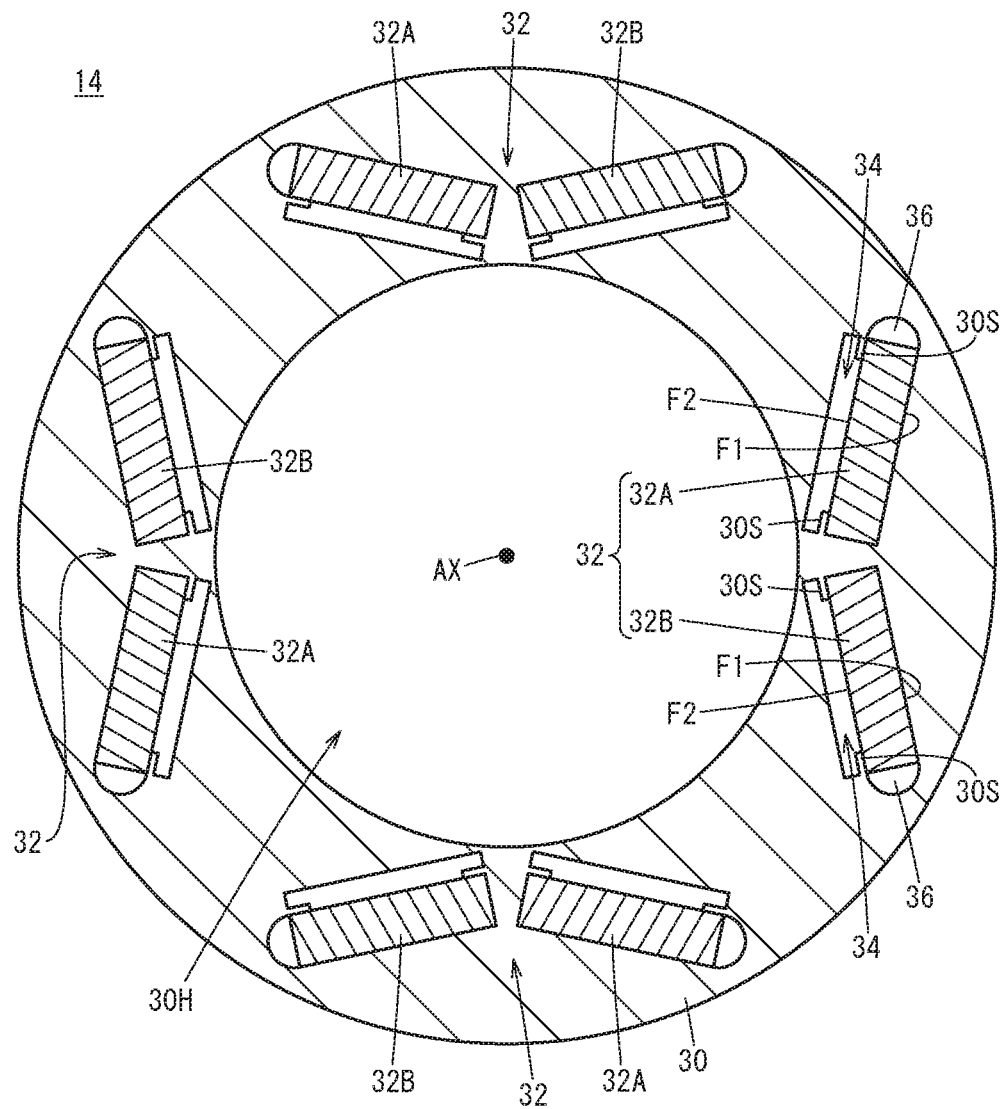
FIG. 5 is a schematic diagram showing a rotor of Modification 1, viewed from the same viewpoint as FIG. 2.

FIG. 5 is a schematic diagram showing a rotor 14 of Modification 1 from the same viewpoint as in FIG. 2. In FIG. 5, the same components as those described in the above embodiment are allotted with the same reference numerals. It should be noted that, in this modification, description that overlaps with the above-described embodiment is omitted.

In this modification, when the rotor core 30 is viewed from the direction of the central axis AX of the rotor core 30, the pair of magnet pieces 32A and 32B are arranged in a V-shape so that the distance between the magnet pieces becomes greater toward the outer periphery of the rotor core 30. The pair of magnetic pole surfaces F1 and F2 of the magnet piece 32A are not parallel to the pair of magnetic pole surfaces F1 and F2 of the magnet piece 32B, and each of the magnetic pole surfaces F1 and F2 is inclined so as to gradually approach the outer peripheral side of the rotor core 30 as they extend in the circumferential direction of the rotor core 30.

Thus, by arranging the pair of magnet pieces 32A and 32B in a V-shape in the above manner, it is possible to further reduce the iron loss compared to the case where the magnetic pole faces F1 and F2 of the pair of magnet pieces 32A and 32B are arranged parallel to each other.

(Modification 2)

Figure 6:
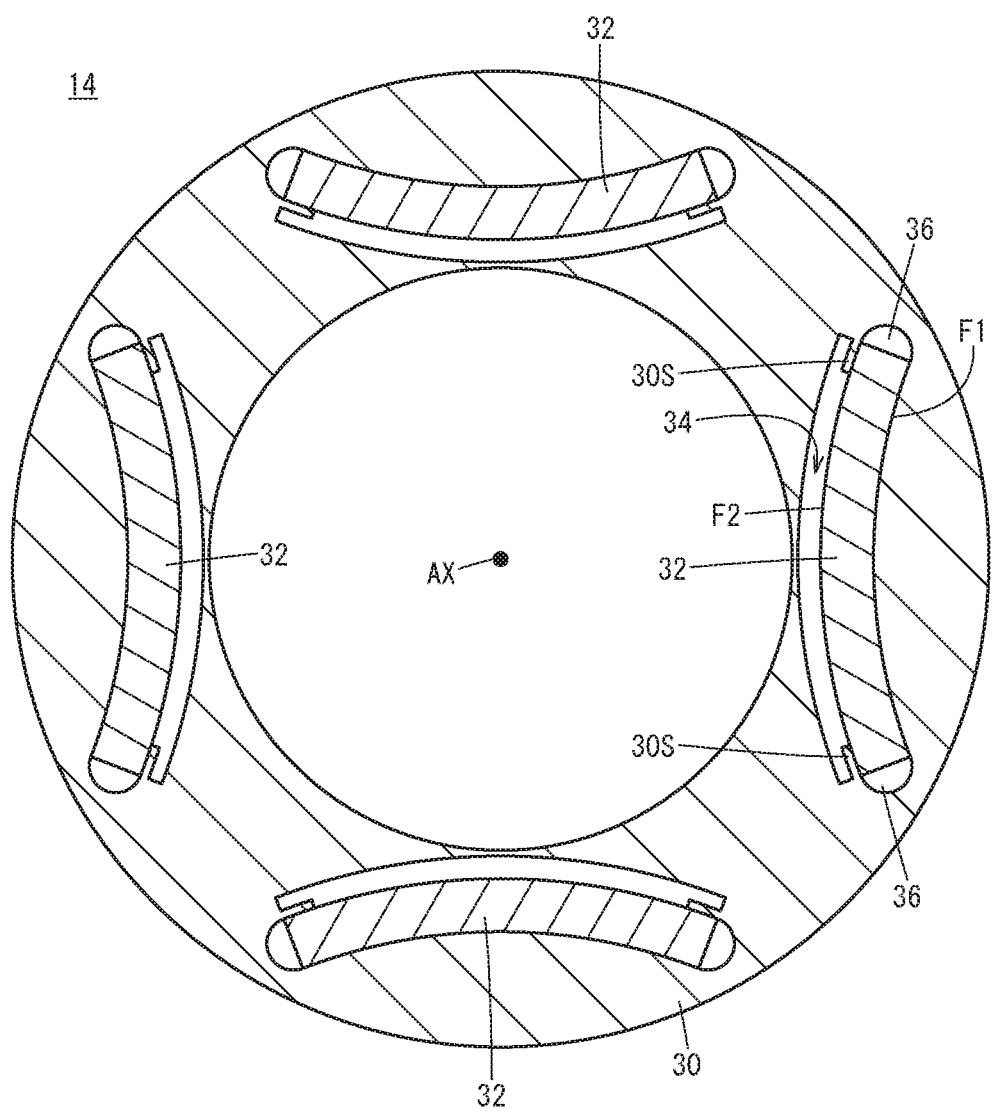
FIG. 6 is a schematic diagram showing a rotor of Modification 2, viewed from the same viewpoint as FIG. 2.

FIG. 6 is a schematic diagram showing a rotor 14 of Modification 2 from the same viewpoint as in FIG. 2. In FIG. 6, the same components as those described in the above embodiment are allotted with the same reference numerals. It should be noted that, in the present modification, description that overlaps with the above embodiment is omitted.

In the above embodiment, each of the magnets 32 forming multiple poles is divided, but the magnet 32 may be undivided as in this modification. When each of the magnets 32 forming multiple poles is not divided, each magnet 32 has a pair of magnetic pole faces F1 and F2 located in a direction intersecting with the radial direction of the rotor core 30. In this case, multiple voids 34 are provided respectively for the multiple pole magnets 32. That is, the number of voids coincides with the number of poles, and each of the multiple voids 34 is surrounded by the rotor core 30 and the magnet 32.

Each of the multiple voids 34 is in contact with the entire magnetic pole surface F2, which is located on the side closer to the central axis AX of the rotor core 30, except for the regions in contact with the supporting members 30S. The supporting members 30S are a pair of projections protruding from the rotor core 30 toward the void 34 from both ends of the void 34, and support each of the magnets 32 forming multiple poles.

In this way, even if each of the magnets 32 forming multiple poles is undivided, the same effect as in the above embodiment can be obtained. In this modification, the paired magnetic pole faces F1 and F2 are curved, but they may be flat. That is, as long as the magnets 32 forming multiple poles are each plate-shaped, the specific shape is not particularly limited. The same applies to the shapes of the magnet pieces 32A and 32B.

Inventions Obtained from the Embodiment

Inventions that can be grasped from the above embodiment and modifications will be described below.
(First Invention)

The first invention is a rotor (14), including:
a rotor core (30);
a plurality of plate-shaped magnets (32) forming multiple poles, each of the magnets being arranged in the rotor core (30) with a pair of magnetic pole faces (F1, F2) thereof being positioned in a direction intersecting with a radial direction of the rotor core (30); and
a plurality of voids (34) formed in the rotor core (30), each arranged in contact with one magnetic pole face (F2) of the magnetic pole faces that is located on a side closer to the central axis (AX) of the rotor core (30), of each of the magnets (32) forming multiple poles.

This configuration makes it possible to reduce iron loss while suppressing decrease in torque constant as much as possible without widening the gap between the stator (12) and the rotor (14).

Each of the multiple voids (34) may be configured to be in contact with the entire region of the one magnetic pole face (F2) located on the side closer to the central axis (AX) of the rotor core (30), except portions thereof in contact with the supporting members (30S). This arrangement can further reduce the iron loss compared to the case where the void is not in contact with the entire region except the portions in contact with the supporting members (30S).

When the rotor core (30) is viewed from the axial direction of the central axis (AX) of the rotor core (30), the angle (θ) formed by two line segments connecting the center of the rotor core (30) to respective two vertexes (P1, P2) of the magnet (32) of one pole may be configured to be smaller than a value obtained by dividing 360° by the number of the poles of the magnets (32), for any of the magnets (32) forming multiple poles, the two vertexes being farthest from each other on the side closer to the central axis (AX) of the rotor core (30). This makes it easy to increase the ratio of the iron loss reduction relative to the torque constant reduction.

The above angle (θ) for any of the magnets (32) forming multiple poles may be configured to be equal to 61.28° or less. With this configuration, it is possible to increase the ratio of the iron loss reduction relative to the reduction of the torque constant, regardless of the size of the contact area of the void (34) with the magnetic pole surface (F2).

Each of the magnets (32) forming multiple poles may be divided into a pair of magnet pieces (32A, 32B) having the magnetic pole directions with respect to the radial direction of the rotor core (30), and each of the multiple voids (34) may be arranged in contact with the one magnetic pole face (F2), of each of the divided magnet pieces (32A, 32B), that is located on the side closer to the central axis (AX) of the rotor core (30). This makes it possible to further reduce iron loss compared to the case where each of the magnets (32) forming multiple poles is undivided.

When the rotor core (30) is viewed from the axial direction of the central axis (AX), the pair of magnet pieces (32A, 32B) may be arranged in a V-shape so that the distance between the magnet pieces becomes greater toward the outer periphery of the rotor core (30). This arrangement makes it possible to further reduce the iron loss compared to the case where the magnetic pole faces (F1, F2) of the pair of magnet pieces (32A, 32B) are arranged parallel to each other.

(Second Invention)

The second invention is a motor (10) including the above rotor (14) and a stator (12). Since this motor (10) includes the above-described rotor (14), it is possible to reduce iron loss while suppressing decrease in torque constant as much as possible without widening the gap between the stator (12) and the rotor (14).

The present invention is not particularly limited to the embodiment described above, and various modifications are possible without departing from the essence and gist of the present invention.

What is claimed is:

1. A rotor, comprising:
    a rotor core;
    a plurality of plate-shaped magnets forming multiple poles, each of the magnets being arranged in the rotor core with a pair of magnetic pole faces thereof being positioned in a direction intersecting with a radial direction of the rotor core;
    a plurality of voids formed in the rotor core and each arranged in contact with one magnetic pole face of the magnetic pole faces that is located on a side closer to a central axis of the rotor core, of each of the magnets forming multiple poles, wherein a first void of the plurality of voids extends at least a majority of a length of the one magnetic pole face that is located on the side closer to the central axis of the rotor core, wherein the first void is a gap defined between the one magnetic pole face and a surface of the rotor core that faces the one magnetic pole face; and
    a projection protruding from the rotor core towards the first void and in contact with an end portion of the one magnetic pole face, the first void being wider than a thickness of the projection, the thickness being measured in a direction perpendicular to the one magnetic pole face, wherein a gap is defined between the projection and the surface of the rotor core in the direction perpendicular to the one magnetic pole face.

2. The rotor according to claim 1, wherein each of the multiple voids is configured to be in contact with an entire region of the one magnetic pole face located on the side closer to the central axis of the rotor core, except portions thereof in contact with the projection.

3. The rotor according to claim 1, wherein, when the rotor core is viewed from an axial direction of the central axis of the rotor core, an angle formed by two line segments connecting a center of the rotor core to respective two vertexes of the magnet of one pole is configured to be smaller than a value obtained by dividing 360° by a number of poles of the magnets, for any of the magnets forming multiple poles, the two vertexes being farthest from each other on a side closer to the central axis of the rotor core.

4. The rotor according to claim 3, wherein the angle for any of the magnets forming multiple poles is configured to be equal to 61.28° or less.

5. The rotor according to claim 1, wherein:
    each of the magnets forming multiple poles is divided into a pair of magnet pieces having same magnetic pole directions with respect to the radial direction of the rotor core; and
    each of the multiple voids is arranged in contact with the one magnetic pole face, of each of the divided magnet pieces, that is located on the side closer to the central axis of the rotor core.

6. The rotor according to claim 5, wherein, when the rotor core is viewed from an axial direction of the central axis of the rotor core, the pair of magnet pieces are arranged in a V-shape so that a distance between the magnet pieces becomes greater toward an outer periphery of the rotor core.

7. A motor comprising:
    the rotor according to claim 1; and
    a stator.

8. The rotor according to claim 1, wherein the first void of the plurality of voids overlaps with a center of the one magnetic pole face.

9. The rotor according to claim 1, wherein the projection is positioned between the one magnetic pole face and the surface of the rotor core that faces the one magnetic pole face.

* * * * *